United States Patent [19]
Cloeren

[11] Patent Number: 5,234,649
[45] Date of Patent: Aug. 10, 1993

[54] END FEED EXTRUSION
[75] Inventor: Peter F. Cloeren, Orange, Tex.
[73] Assignee: The Cloeren Company, Orange, Tex.
[21] Appl. No.: 898,477
[22] Filed: Jun. 15, 1992
[51] Int. Cl.$^5$ .............................. B29C 47/12
[52] U.S. Cl. ................ 264/171; 425/131.1; 425/133.5; 425/461; 425/462
[58] Field of Search ............... 264/171; 425/133.5, 425/131.1, 461, 462

[56] References Cited

U.S. PATENT DOCUMENTS

| | | |
|---|---|---|
| 3,057,010 | 10/1962 | Reifenhauser . |
| 3,308,222 | 3/1967 | Kovacs ........................... 425/133.5 |
| 3,432,588 | 3/1969 | Breidt, Jr. et al. ................ 264/171 |
| 3,524,795 | 8/1970 | Peterson ............................ 264/171 |
| 3,583,032 | 6/1971 | Stafford . |
| 3,761,211 | 9/1973 | Parkinson ......................... 425/462 |
| 3,909,170 | 9/1975 | Riboulet et al. . |
| 4,289,560 | 9/1981 | Simons ............................. 425/133.5 |
| 4,293,517 | 10/1981 | Knox ................................ 425/461 |
| 4,372,739 | 2/1983 | Vetter et al. . |
| 4,426,344 | 1/1984 | Dinter et al. ..................... 425/462 |
| 4,600,550 | 7/1986 | Cloeren ............................ 425/462 |
| 4,880,370 | 11/1989 | Krumm . |

OTHER PUBLICATIONS

Cloeren Extrusion Apparatus P.
Cloeren Extrusion Apparatus O.

Primary Examiner—Jeffery Thurlow
Attorney, Agent, or Firm—Timothy R. Kroboth

[57] ABSTRACT

The present invention provides a novel extrusion apparatus and process that avoid flow stream divergence. More particularly, an improved end feed, extrusion apparatus and process are provided. Compensation by gap adjustment is beneficially reduced.

24 Claims, 7 Drawing Sheets

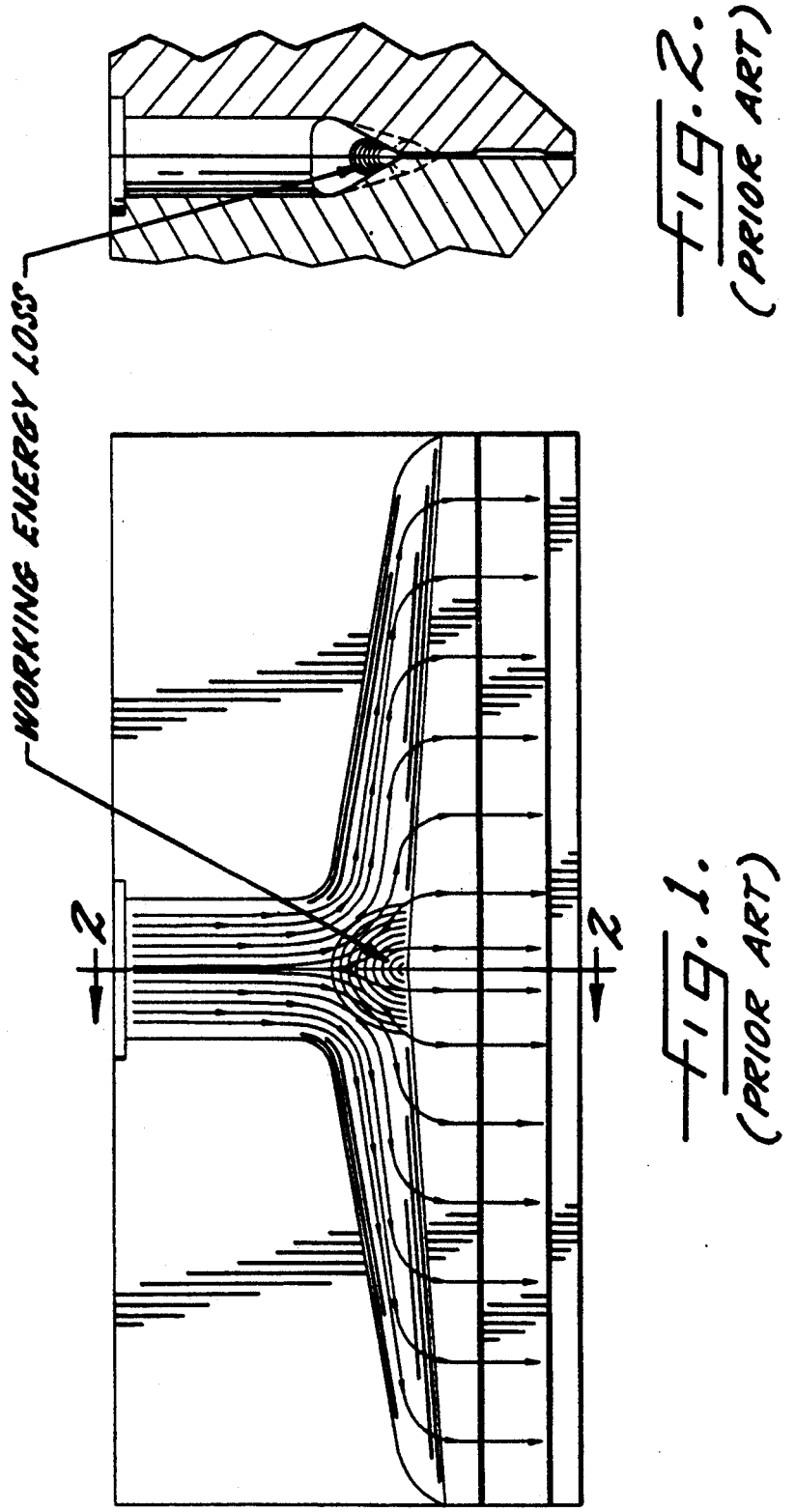

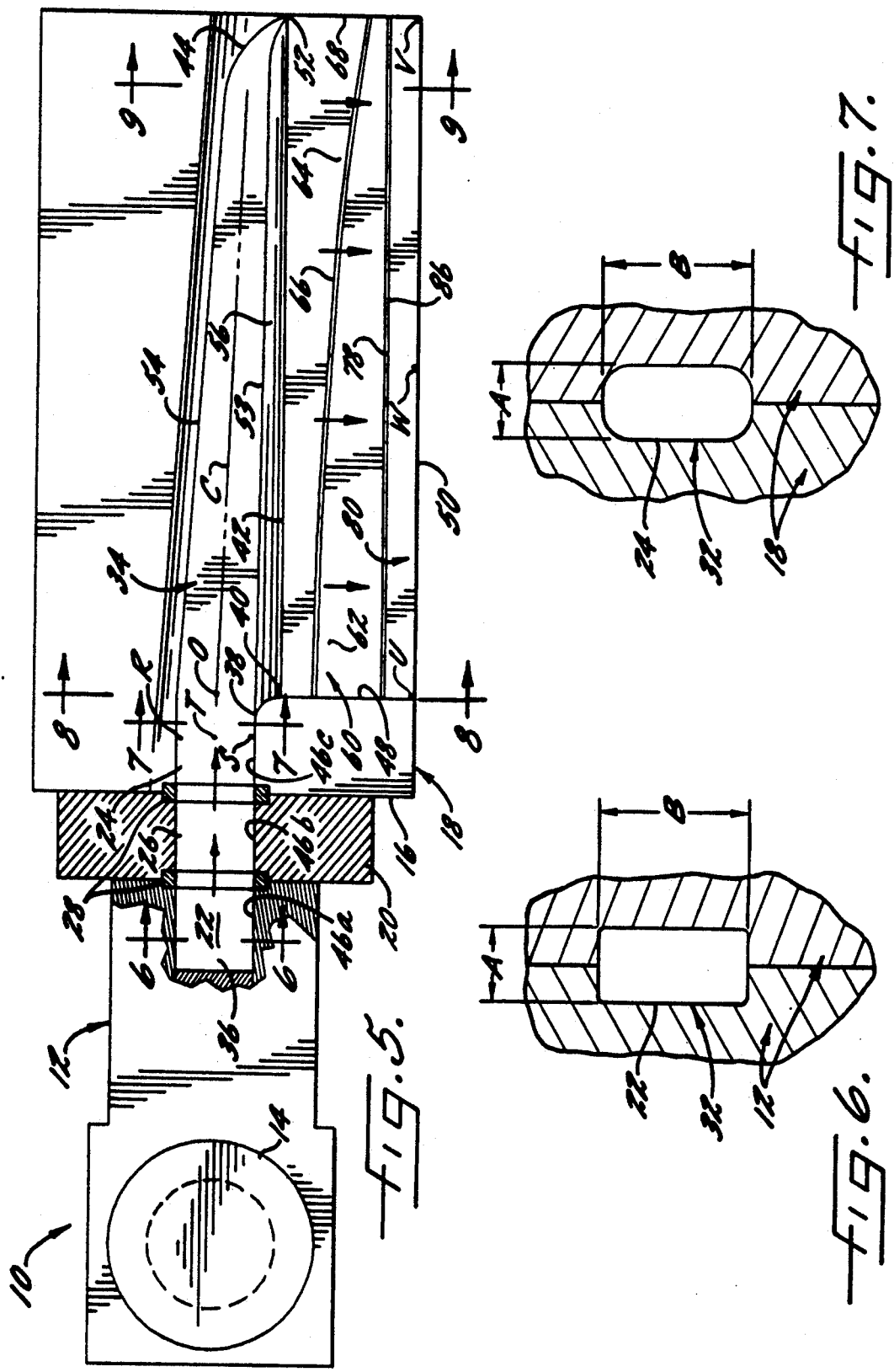

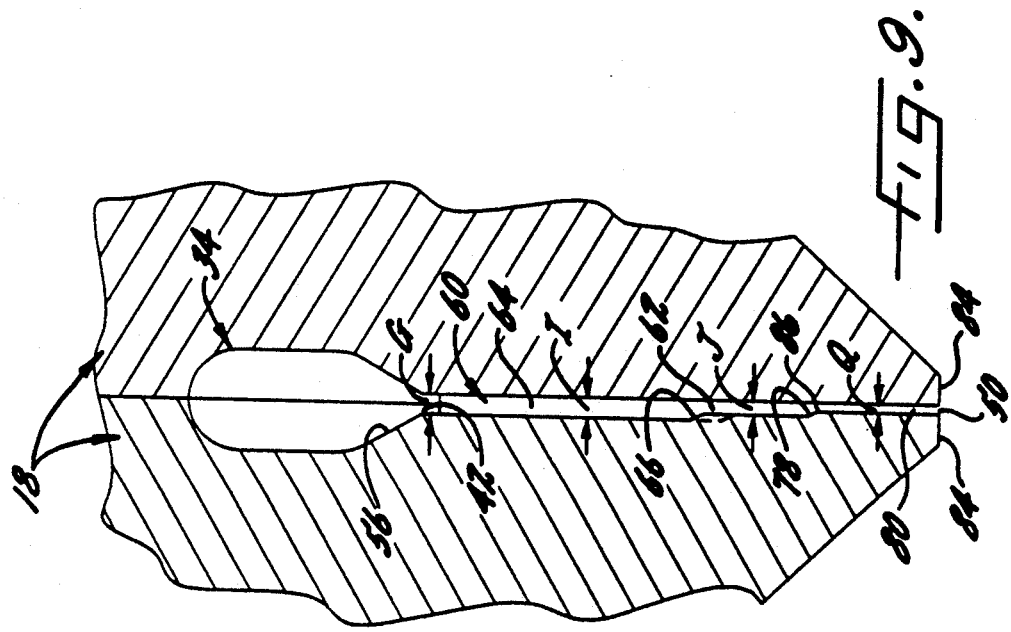
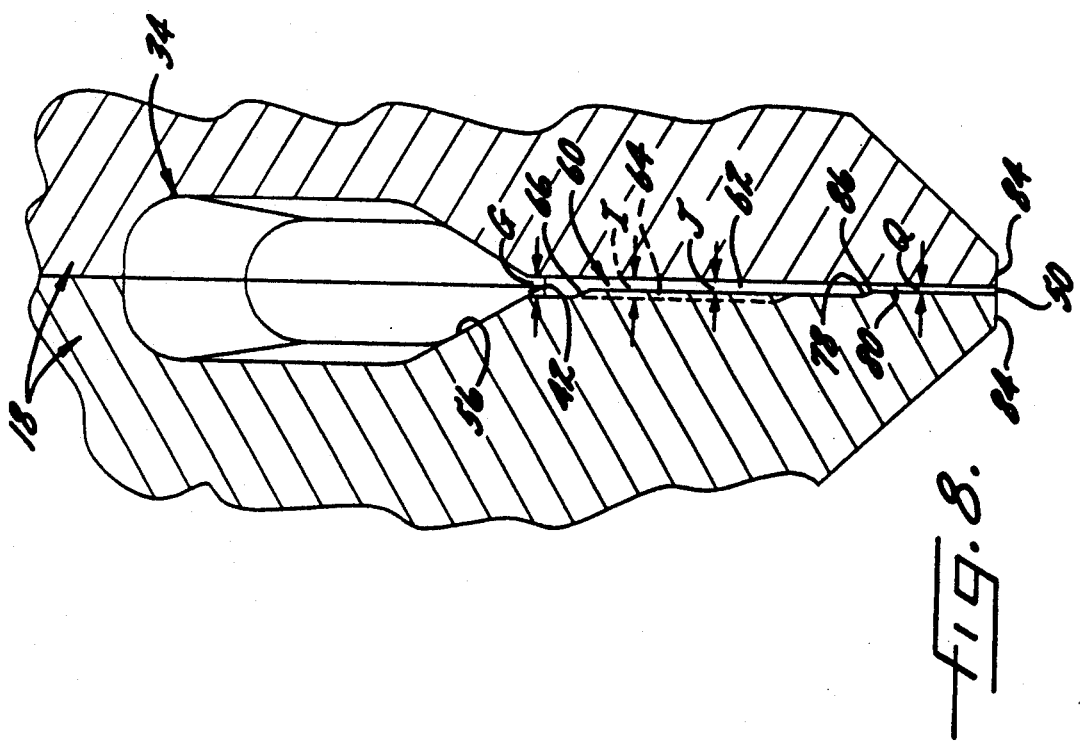

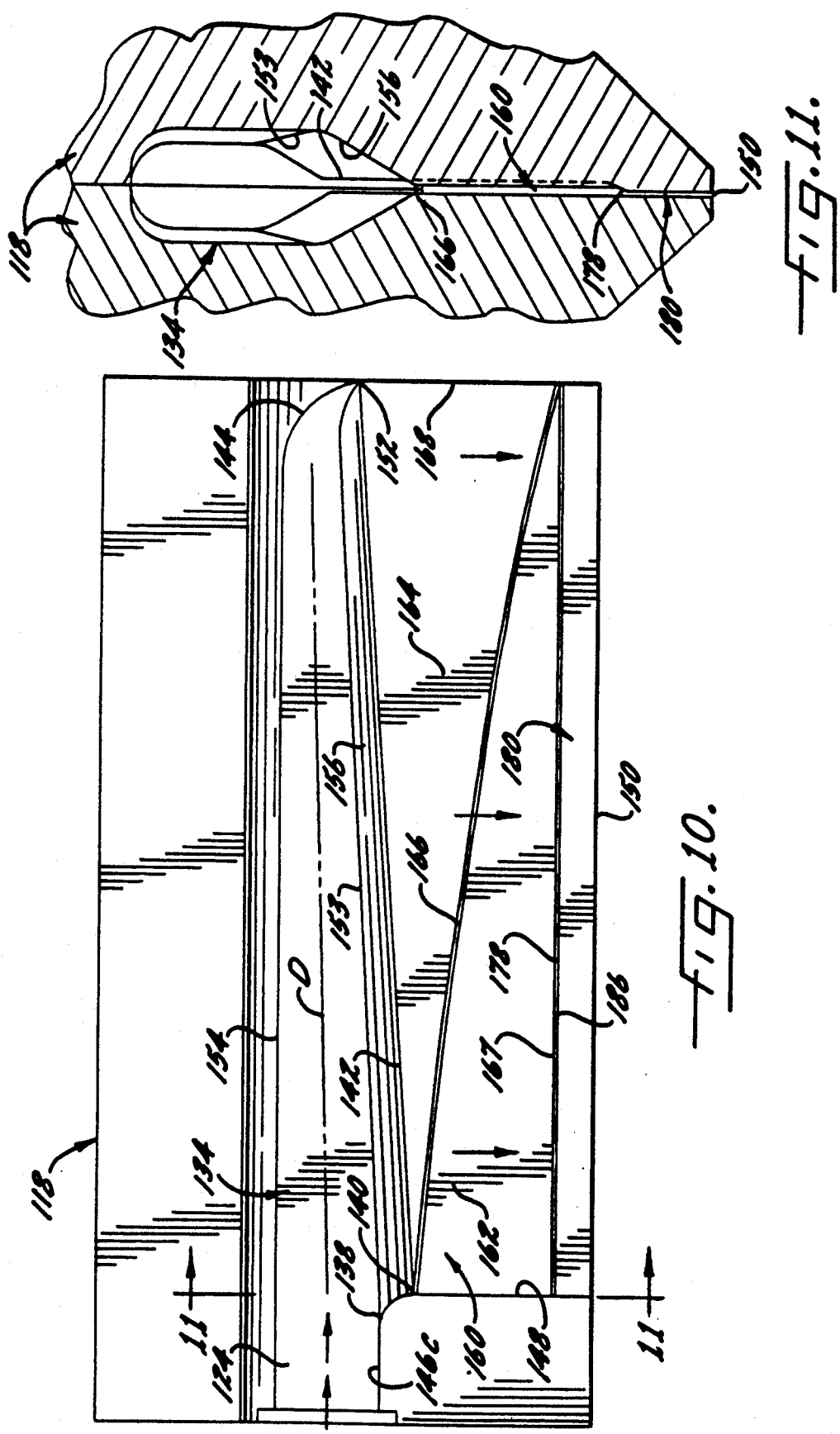

END FEED EXTRUSION

BACKGROUND OF THE INVENTION

This invention relates to an end feed, extrusion apparatus and process.

Center feed, extrusion dies are commonly used in today's plastics industry. A flow stream entering the manifold undergoes flow divergence, as a result of which there occurs a division of the stream into substreams that flow in generally opposite directions to both ends of the manifold. Pressure drop occurs as each substream flows from the centerline of the manifold to its respective manifold end.

Typically, center feed, extrusion dies have a tear drop-shaped, coat hanger-type manifold. To overcome the pressure drop and produce a substantially equal flow volume of a stream across the stream width, this type of prior art apparatus further includes a single stage, flow pressure-compensating, preland channel. Flow divergence and stream flow in this type of prior art apparatus are generally illustrated in FIG. 1.

Also known is a center feed, extrusion apparatus having a two stage, flow pressure-compensating, preland channel. This type of apparatus is exemplified in U.S. Pat. No. 4,372,739 to Vetter et al and U.S. patent application Ser. No. 852,825 in the name of Peter F. Cloeren.

Flow divergence in a center feed, extrusion apparatus has an adverse impact on layer uniformity of a composite stream of diverse materials. In the course of flow divergence, abrupt and sudden changes occur in flow direction, flow velocity and flow stream geometry, particularly near the centerline of the manifold where a resultant loss of energy is amplified and as a consequence, disuniformity of flow energy loss is accentuated. FIGS. 1 and 2 illustrate working energy loss in the area of flow divergence, in a tear drop-shaped, coat-hanger type manifold.

Each flow stream material has its own "hydraulic value", that is, its own rheological characteristics and properties, in particular temperature dependent characteristics and properties such as melt viscosity, elasticity and so forth. Accordingly, when a composite stream of diverse materials or polymers is subjected to flow divergence, each material reacts differently, with resulting disruption of widthwise layer uniformity. To correct the disruption in layer uniformity, the composite stream may be profiled, that is, the shape of individual layers of the composite stream may be mechanically altered upstream of the place of flow divergence.

An advantage of an end feed, extrusion apparatus is that there is no flow divergence, that is, there is no division of a flowstream into substreams that flow in generally opposite directions, and disuniformity in loss of flow energy accompanying change in flow direction is reduced. U.S. Pat. Nos. 3,583,032 to Stafford, 3,908,170 to Riboulet et al, and 4,880,370 to Krumm exemplify prior art, end feed, extrusion apparatus.

However, according to this prior art, divider blades within the manifold, processing adjustments, or a multi-manifold apparatus are necessary to provide for individual layer uniformity. Moreover, this end feed, prior art is unsatisfactory in further significant respects.

The Stafford and Riboulet et al patents illustrate the use of an end feed, extrusion apparatus having a generally pipe-shaped manifold. However, a drawback of this type of apparatus is the lack of a zone that compensates for substantially unequal flow volume across a stream width, prior to the stream reaching the exit orifice. As a result, this type of apparatus is typically limited to the extrusion of low viscosity materials.

FIG. 3 illustrates my concept of stream flow in an end feed apparatus having a generally pipe-shaped or circular manifold 1 in communication with an elongated, slot-like, exit orifice 2 for extrusion of flat films, as taught by Riboulet et al. FIG. 4 depicts the velocity profile of a stream within the manifold of this type of apparatus.

The Krumm patent illustrates the use of an extrusion apparatus including end feed plates having a "half coathanger manifold". Advantageously, these end feed plates include a single stage, flow pressure-compensating zone, and accordingly, may be applicable to the extrusion of higher viscosity materials. However, a half coat-hanger manifold, end feed apparatus is detrimentally affected by substantial non-uniform, die body deflection.

Thus, this end feed, prior art is also severely limited either by lacking a flow pressure-compensating zone, or by substantial non-uniform, die body deflection.

Therefore, there is a need for an improved extrusion apparatus that avoids flow divergence and reduces disuniformity in loss of flow energy accompanying change in flow direction. In particular, there is a need for an improved end feed, extrusion apparatus that not only meets these objectives but also does not require divider blades within the manifold, processing adjustments as described by Riboulet et al, or a multi-manifold apparatus for individual layer uniformity. It would be remarkable if such an improved, end feed apparatus would also be capable of compensating for substantially unequal flow volume across a stream width and in addition reducing non-uniform, die body deflection. It would be advantageous if such an apparatus would be able to process a diversity of materials, both low viscosity and high viscosity, without adjustable parts downstream of the manifold such as a choker bar, and with reduced lip gap adjustment, in providing a web of uniform thickness. Such an apparatus would make possible an improved end feed, extrusion process.

SUMMARY OF THE INVENTION

It is accordingly an object of the present invention to provide an improved extrusion apparatus that avoids flow divergence and reduces disuniformity in loss of flow energy accompanying change in flow direction.

It is a further object of the present invention to provide an improved end feed, extrusion apparatus that simplifies the processing required to obtain a film having individual layer uniformity.

It is a still further object to provide an improved end feed, extrusion apparatus that is effective in providing for substantially equal flow volume of a stream across the stream width, prior to the stream reaching the exit orifice.

It is an even further object to provide an improved end feed, extrusion apparatus that is also effective in reducing non-uniform, die body deflection.

It is an even additional object to provide an improved end feed, extrusion process.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an improved end feed, extrusion apparatus. The apparatus includes a first channel portion for providing for flow generally in a first main flow direction and for directional change to a second main flow direction without flow divergence. The first main flow direction leads to an end of the first channel portion, and the second main flow direction leads to an exit orifice of the apparatus.

The first channel portion is conveniently provided by a feed channel in fluid communication with a manifold having an output edge. The manifold advantageously has a cross-sectional shape complementary to the feed channel and may be of decreasing cross-sectional area. Beneficially, the manifold has a non-circular shape, with a generally rectangular shape being advantageous.

Downstream of the manifold output edge, the apparatus includes a second channel portion for incrementally compensating for progressive decrease in flow pressure in the first main flow direction, that occurs within the first channel portion. This flow pressure-compensating, channel portion is advantageously a multi-stage zone. Downstream of the multi-stage zone is the exit orifice of the extrusion apparatus.

The pressure-compensating zone includes a primary stage of greater length in the second main flow direction, at an end located closer to the locus at which flow directional change begins, than to the end of the first channel portion. In direct fluid communication with the primary stage, the zone includes a secondary stage of inversely changing length relative to the primary stage. The secondary stage has a greater gap than the primary stage, and as a consequence, is of diminished flow pressure-compensating effect compared to the primary stage.

In one embodiment, the manifold output edge is rectilinear, and the multi-stage, flow pressure-compensating zone has an output edge generally parallel to manifold output edge. In another embodiment, the manifold has a rectilinear back edge, and the multi-stage zone has an output edge generally parallel to the manifold back edge. Also provided is a manifold having rectilinear back and output edges. By the term "rectilinear" is meant for purposes of this invention, generally parallel to the exit orifice. The first main flow direction is typically generally parallel to a rectilinear back or output edge of the manifold.

Also provided by the present invention is an improved end feed, extrusion process. By the process, a stream is passed generally in the first main flow direction to the end of the first channel portion. Beneficially, the stream has a non-circular cross-section within the manifold of first channel portion, with a generally rectangular cross-section being preferred. The stream has a decreasing flow pressure in the first main flow direction. As mentioned, the first channel portion provides for directional change to a second main flow direction without flow divergence.

After passing without flow divergence, through the first channel portion, which is provided with the earlier-described rectilinear edge, the stream flow is in the second main flow direction. Thereafter, the stream is passed in the second main flow direction through the flow pressure-compensating, channel portion, and then through the exit orifice. As a result, the stream is beneficially provided with improved uniformity in flow volume across the stream width prior to reaching the exit orifice, and advantageously exerts reduced non-uniform, deflection forces across its width at the exit orifice.

In the drawing and in the detailed description of the invention that follows, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWINGS

Reference is now made to the accompanying drawing, which forms a part of the specification of the present invention, and which illustrates preferred embodiments of the present invention.

FIG. 1 generally illustrates stream flow in prior art, center feed, extrusion apparatus having a coat hanger-type manifold;

FIG. 2 is a cross-sectional view taken substantially along line 2—2 of FIG. 1;

FIG. 5 is a plan view illustrating in particular a die body half of an end feed, extrusion apparatus in accordance with the present invention, with arrows indicating the two main directions of stream flow;

FIGS. 6-9 are enlarged cross-sectional views taken substantially along the respective lines of FIG. 5;

FIG. 10 is a plan view similar to that of FIG. 5, of a second preferred embodiment of a die body half of an end feed, extrusion apparatus in accordance with the present invention;

FIG. 11 is an enlarged cross-sectional view taken substantially along line 11—11 of FIG. 10;

DETAILED DESCRIPTION OF THE INVENTION

Figure 3:
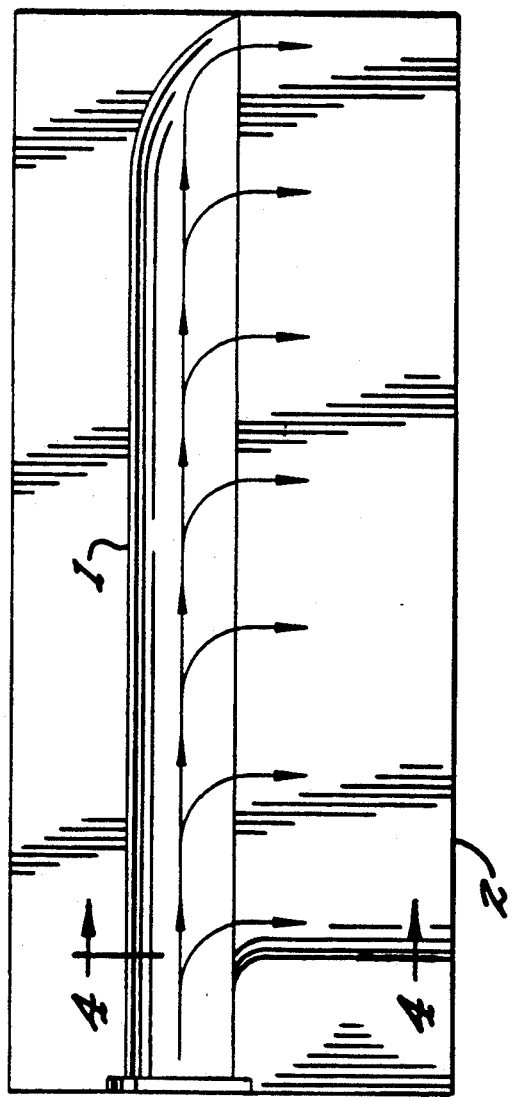
FIG. 3 illustrates stream flow in a prior art, end feed apparatus having a generally pipe-shaped or circular manifold.
Figure 4:
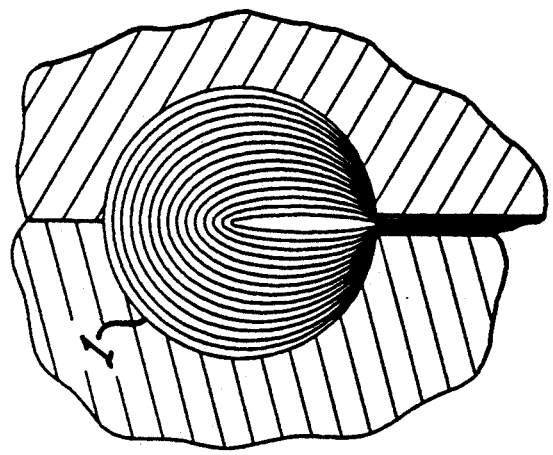
FIG. 4 is an enlarged cross-sectional view taken substantially along line 4—4 of FIG. 3.

As explained above, the present invention is directed to an improved extrusion apparatus and process. Beneficially, this type of extrusion apparatus and process avoid flow divergence, that is, flow stream division into substreams that flow in generally opposite directions, and reduce flow energy loss and disuniformity in flow energy loss accompanying change in flow direction.

By the present invention, a composite layered stream of diverse materials, that is, having for instance, dissimilar melt viscosities and different elastomeric values, may be coextruded by an end feed apparatus without manifold dividers and with reduced processing adjustments, to form a film having uniform individual layers. Although reference is primarily made to polymeric materials in this description of my invention, it will be appreciated that this invention is likewise applicable to non-polymeric fluids.

In addition, the present invention advantageously provides for substantially equal flow volume of a stream across the stream width, prior to the stream reaching the exit orifice. Moreover, unlike prior art, end feed apparatus of which I am aware, non-uniform, die body deflection is also reduced. As a result, when a stream reaches the exit orifice of an end feed, extrusion apparatus in accordance with the present invention, compensation by exit orifice gap adjustment is minimized in producing a web of uniform thickness.

A further advantage of the present invention is that it makes possible the production of an extruded film substantially free of "residual radial melt orientation". This defect is characterized by a tendency of extruded film to manifest radial curvature. It is my theory that the radial curvature is produced by radial molecular orientation during abrupt flow directional change and by abrupt and non-uniform loss of flow energy in connection with the directional change.

Referring to FIG. 5, a preferred end feed, extrusion apparatus 10 in accordance with the present invention, is shown. Extrusion apparatus 10 provides for coextrusion of a multi-layer composite. To this end, a stream-combining feedblock 12 is beneficially provided with an interchangeable, layer sequence-arranging plug 14, the feedblock is connected to an end 16 of an extrusion die 18 (both halves shown in FIGS. 8 and 9) by a mounting plate 20, and an exit channel 22 of the feedblock communicates with an entry channel 24 of the extrusion die through channel 26 of the mounting plate. Sealing gaskets 2 prevent leakage.

Together, channels 22, 26 and 24 form an end feed channel 32 (shown in FIGS. 6, 7) for end feeding a flow stream in a first main flow direction, indicated by arrows, into a manifold 34 disposed in the extrusion die body. It will, of course, be understood that an extruder could directly communicate with entry channel 24 of the extrusion die, for extrusion of a monolithic flow stream.

Advantageously, as indicated in FIGS. 6 and 7, end feed channel 32 has a substantially constant, generally rectangular, cross-sectional area from a locus 36 of flow channel convergence (indicated in FIG. 5), at which feedblock exit channel 22 is formed, up to a locus 38 at which feed channel 32 ends and directional change commences. Thus, a channel height A and a channel width B beneficially remain substantially constant. As indicated in FIGS. 6 and 7, a change in cross-sectional area occurs as the corners round into fillet radii. In addition, the radius of each fillet may undergo change. As a result, the composite layered stream, which has layers in contiguous relationship, substantially maintains its shape and cross-sectional area from the convergence locus up to the manifold. The manifold may be understood to begin at locus 38.

Referring to FIGS. 8 and 9, it may be seen that manifold 34 may have a complementary non-circular shape. A generally rectangular shape will typically be preferable for extrusion of a composite stream, and beneficially permits the cross-sectional area to be changed by varying channel height or width independently of one another. In the case of a monolithic stream, a tear drop-shape may be used.

With reference again to FIG. 5, the manifold advantageously provides for flow generally in the first main flow direction, to a far end 44 of the manifold without flow divergence. The manifold moreover provides for directional change to a second main flow direction, indicated by arrows, without flow divergence. By comparison, a flow stream in a center feed, extrusion apparatus undergoes flow divergence and change to a second main flow direction prior to reaching the manifold end and has a manifold entrance, included angle of 90 or more.

As mentioned earlier, locus 38 marks the place at which change to the second main flow direction begins. However, each flow stream segment has its own respective point downstream of locus 38 in the first main flow direction, at which its respective flow directional change commences.

The second main flow direction leads to the exit orifice of the apparatus. Typically, the second main flow direction is generally perpendicular to the first main flow direction.

It may be of course, understood that there could be an angle in the flow direction between the convergence locus and manifold end 44, provided that the angle provides for flow generally in the first main flow direction and enables stream flow to be maintained without an abrupt or sudden loss of flow energy. Any such angle must therefore be significantly less than 90°. Thus, flow into the manifold is generally in the first main flow direction, and continues for a segment of the flow stream, generally in the first main flow direction until manifold end 44 is reached.

However, the flow may be straight-line flow from the convergence locus to each respective point of flow directional change, and for a segment of the stream, be straight-line flow from the convergence locus to manifold end 44. An axis of the manifold, is indicated by a dotted line C in FIG. 5.

With continued reference to FIG. 5, walls 46a, 46b, 46c of channels 22, 26, 24, respectively, are connected by a radius to an inner wall 48 of extrusion die 18. A point 40 designates the end of the radius and the beginning of wall 48. It may be seen that wall 48 is generally perpendicular to the upstream walls.

Output edge 42 of the manifold may be rectilinear, that is, substantially parallel to a downstream exit orifice 50. The manifold output edge intersects with manifold end 44, and more particularly has an end point 52 that intersects with a radius from a boundary line 53 of the manifold, and that also intersects with a radius from a back edge 54 of the manifold. A gap G, shown in FIGS. 8 and 9, at output edge 42 may be substantially constant.

Referring again to FIGS. 8 and 9, the manifold may be provided with a progressively diminishing cross-sectional area in the first main flow direction, in order to provide for reduced residence time and increased flow velocity within the manifold. These two figures show a decreased height and decreased width in the first main flow direction. In this respect, with reference also to FIG. 5, back edge 54 may be linear in the first main flow direction up to the point at which the radius to end point 52 begins, but angled toward manifold output edge 42.

A flow transition wall 56 of decreasing length in the second main flow direction, bridges between manifold boundary line 53, which forms the leading edge of wall 56, and the manifold output edge. When the height of the manifold is constant, wall 56 may be of constant length up to the point at which the radius to end point 52 begins.

Alternatively, a diminishing cross-sectional area manifold may have a geometry as shown in FIGS. 10 and 11, in which like parts have been numbered in correspondence to FIGS. 5-9. Arrows indicate the two main directions of stream flow. An axis of a manifold 134 is indicated by a dotted line D.

As shown in FIG. 11, manifold 134 has a generally rectangular, cross-sectional shape. An output edge 142 of the manifold has a far end point 152 that intersects with a radius from a manifold boundary line 153, and that also intersects with a radius from a back edge 154. Beneficially, back edge 154 is rectilinear, and the manifold output edge may be linear in the first main flow direction, but angled toward the rectilinear back edge.

Figure 13:
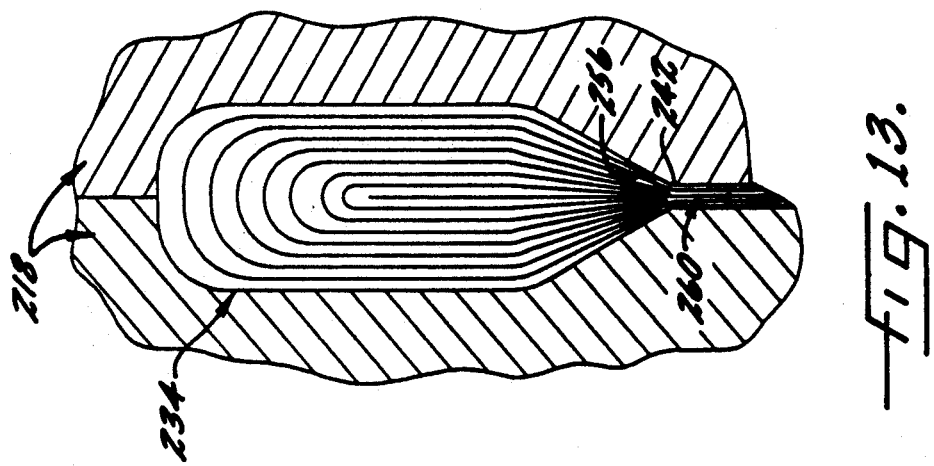
FIG. 13 is an enlarged cross-sectional view taken substantially along line 13—13 of FIG. 12, showing the stream velocity profile.
Figure 12:
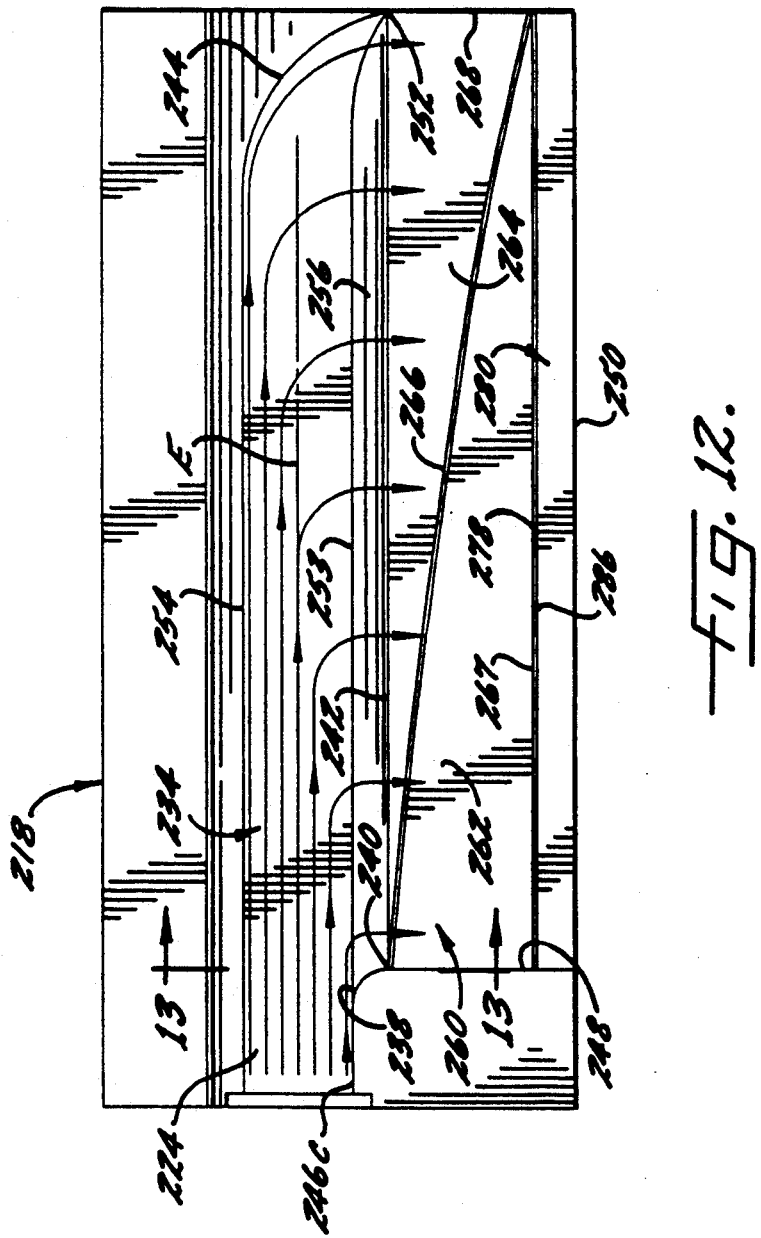
FIG. 12 is a plan view similar to that of FIG. 5, which generally depicts stream flow within a third preferred embodiment of a die body half of an end feed, extrusion apparatus in accordance with the present invention.

A substantially constant, cross-sectional area manifold 234 is illustrated in FIGS. 12 and 13, in which like parts have been numbered in correspondence to prior FIGS. 5-11. In FIG. 12, arrows illustrate the stream flow. In FIG. 13, the velocity profile of a stream in this embodiment of the present invention is depicted.

FIG. 12 particularly depicts straight-line, viscous flow for each flow stream segment to its respective point of flow directional change. As will become better understood, this embodiment beneficially includes a flow pressure-compensating zone. An axis of the manifold for the viscous flow, is indicated by a dotted line E. By comparison, it is my theory that the length of the transitional radius between the two main flow directions is relatively shorter in the embodiment of FIG. 5, and is relatively longer in the embodiment of FIG. 10.

Manifold 234 has a generally rectangular, cross-sectional shape. In this type manifold, both the manifold back edge and output edge may be rectilinear. An output edge 242 of the manifold has a far end point 252 that intersects with a radius from a manifold boundary line 253, and that also intersects with a radius from a back edge 254.

A rectilinear back edge and output edge may also be provided by a tear drop-shaped manifold having a substantially constant, cross-sectional area. This type of manifold is illustrated in the center feed, extrusion apparatus of U.S. Pat. No. 3,057,010 to Reifenhauser, and is also known in a center-feed, extrusion apparatus having a two stage, flow pressure-compensating, preland channel as set forth in earlier mentioned, Ser. No. 852,825.

Regardless whether the manifold has a diminishing or substantially constant cross-sectional area, the manifold may be provided with a constant aspect ratio, cross-section, that is, the ratio of the height divided by the width remains constant, from the locus at which flow directional change begins to the far end of the manifold. Also in either case, a drop in flow pressure progressively occurs as a flow stream moves in the first main flow direction through the manifold feed channel and to the far end of the manifold; however, pressure drop is greater in a diminishing cross-sectional area manifold. Pressure drop is not only dependent upon flow channel geometry but also upon flow rate through the apparatus and polymer viscosity.

Advantageously, particularly in the extrusion of a fluid of high visco-elasticity, the channel geometry may provide for a substantially constant shear rate in the manifold feed channel and through the manifold to the far end of the manifold. The shear rate may be maintained substantially constant by appropriately decreasing the channel cross-sectional area, and in this respect, channel height or width, or channel height and width, may be changed as required.

As indicated earlier, flow convergence is beneficially completed prior to stream entry into the manifold, but may occur thereafter when the present invention is applied to a multi-manifold, extrusion apparatus. Downstream of the manifold is a multi-stage, flow pressure-compensating zone formed by the respective preland (or primary stage) and undercut preland (or secondary stage) channels. As will become clearer, this zone compensates for upstream pressure drop in the first main flow direction, and beneficially may provide for substantially equal flow volume transverse to the second main flow direction. Downstream of this zone, which may be spaced apart from the manifold by a flow-stabilizing zone, a land channel terminates in a typically elongated, slot-like, exit orifice.

With reference again to FIG. 5, a multi-stage, flow pressure-compensating zone 60 includes a primary flow pressure-compensating stage 62 and, in direct fluid communication therewith, a secondary flow pressure-compensating stage 64. Zone 60 has an output edge that may be defined by a line generally parallel to rectilinear manifold output edge 42, and that begins at a point of intersection of a transition wall 66 which bridges between stages 62, 64, and an inner wall 68 of the extrusion die. Wall 68 is a continuation of back edge 54 via a radius that ends at point 52.

Advantageously, zone 60 has a substantially constant length in the second main flow direction that is further provided by a leading edge that may be defined by a line also generally parallel to manifold output edge 42, and that begins at a point of intersection of the transition wall 66 and near inner wall 48 of zone 60. As indicated earlier, wall 48 is a continuation of wall 46c via a radius. Accordingly, it may be understood that the leading edge of zone 60 is spaced apart from the manifold; however, if desired, manifold output edge 42 may constitute the leading edge of zone 60.

With reference to FIGS. 8 and 9, the secondary stage has a gap I greater than the primary stage gap J. As a result, the secondary stage provides less flow pressure-compensating effect than the primary stage. Transition wall 66 will typically be non-linear from inner wall 48 to inner wall 68, and provides for a progressively increasing shear rate as a flow stream passes from the secondary stage to the primary stage. The degree of non-linearity will depend upon, for instance, the extent of pressure drop in the first main flow direction, rheological characteristics of the polymer or polymers extruded, and the height difference between gaps I, J.

Gap I of the secondary stage will be substantially constant transverse to the second main flow direction, and as a consequence, a flow stream passing through the secondary stage will be subjected to substantially constant shear transverse to the second main flow direction. Generally, gap J will likewise also be substantially constant transverse to the second main flow direction.

Referring again to FIG. 5, to compensate for decreasing flow pressure within the manifold in the first main flow direction, primary stage 62 of zone 60 has a relatively greater length at inner wall 48 than at inner wall 68. As can be therefore understood, the primary stage gradually decreases in length in the second main flow direction. Because the primary and secondary stages are in direct fluid communication, the secondary stage is of inversely changing length relative to the primary stage. More particularly, at wall 48, the length of zone 60 is attributable to the primary stage only, and at wall 68, the length of zone 60 is provided by the secondary stage only.

A relatively longer length results in a relatively increased resistance to flow and relatively decreased flow volume; whereas, a relatively shorter length results in a relatively decreased resistance to flow and relatively increased flow volume. The length of zone 60 at wall 48 is selected to compensate for the pressure drop in the first main flow direction, from a point 0, shown in FIG. 5, to manifold end 44. This length is conveniently selected after establishing the incremental pressure drop in the first main flow direction and selecting the zone any event, the gaps and appropriate incremental lengths of the primary and secondary stages of zone 60 are beneficially selected to provide incremental pressure drop compensation so as to provide for substantially equal flow volume of a stream across the stream width.

From wall 48 to wall 68, there is a progressive decrease in the resistance to flow provided by the primary stage of zone 60, and an inversely progressive increase in resistance to flow provided by the secondary stage, with however decreasing flow resistance compared to the primary stage. This flow compensating effect advantageously provides for substantially equal flow volume of a stream across the zone width as the stream exits zone 60. Moreover, every flow stream segment is beneficially provided with a substantially uniform residence time history, that is, substantially equal residence time, as measured by the average flow stream velocity, within the apparatus from the convergence locus to the exit orifice. Thus, flow stream segments at points S,R,T will simultaneously arrive at points U,V,W, respectively, at the exit orifice. This benefit of substantially uniform residence time history may likewise be provided by the embodiments of FIGS. 10 and 12.

Furthermore, an extrusion apparatus in accordance with my invention, advantageously provides for a flow stream segment at point T, which also represents the centerline of the flow stream in the first main flow direction, to pass through the exit orifice at point W, which represents the centerline of the flow stream in the second main flow direction. Similarly, it may be understood that a stream segment at point S follows wall 46c and wall 48 until it reaches point U, and that a stream segment at point R follows back edge 54 and wall 68 until it reaches point V. Accordingly, my invention beneficially provides that every flow path remains proportional to its relative distance from the channel walls; in other words, if a particular flow path is one-third of the distance across channel 24, with reference to wall 46c, the flow path will be one third of the distance across the exit orifice, with reference to wall 48. This novel and highly desired result is likewise provided by the embodiments of FIGS. 10 and 12, and is illustrated in FIG. 12. This result may be contrasted with stream flow in a prior art, end feed apparatus having a circular manifold, depicted in FIG. 3.

A related benefit is that an extrusion apparatus in accordance with the present invention, provides for stream flow from the place of entry into the manifold to the exit orifice, with little or no interfacial boundary distortion. These last two benefits are made possible in part by the avoidance of flow divergence, and it is also my belief cannot be achieved using an end feed, extrusion apparatus having a circular manifold. As a consequence, a composite stream may be provided by an end feed apparatus in accordance with this invention, with individual layer uniformity, without divider blades within the manifold or processing adjustments as described in Riboulet et al.

Spaced apart from, and also separated by a transition wall 78 from, the zone output edge is a land channel 80, which terminates in exit orifice 50 having lips 84, shown in FIGS. 8 and 9. If desired, the zone output edge could form the leading edge of wall 78. The land channel typically has a substantially constant length in the second main flow direction, defined by exit orifice 50 and a leading edge 86, which is generally parallel to the exit orifice.

With reference to FIGS. 8 and 9, the land channel beneficially has a gap Q less than the primary stage gap, and transition wall 78 advantageously provides for a progressive decrease in the gap. As a result, a stream is subjected to an progressively increasing shear rate in the second main flow direction as it passes from the primary stage to the land channel.

Gap Q, which provides flow stabilization, may be the same as primary stage gap J. However, even if the gaps are the same, they will function independently of one another. Gap Q may be larger than gap J depending upon the final product thickness.

Gap Q is suitably substantially constant transverse to the second main flow direction but may permit localized gap adjustment for minor deviations in flow volume transverse to the second main flow direction. However, gap Q may be tapered to be of gradually decreasing height in the second main flow direction.

Beneficially, with further reference to FIG. 5, apparatus 10 provides for a uniform wetted surface area downstream of the manifold output edge, across the channel width. This feature is provided by the manifold output edge being generally parallel to the exit orifice. As a result, stream flow produces deflection forces downstream of the manifold output edge that are generally uniform across the width, and non-uniform, die body deflection is reduced, thereby reducing exit orifice compensation.

With reference again to FIGS. 10 and 11, a flow pressure-compensation zone 160 and a land channel 180 are similar to zone 60 and land channel 80, respectively, of FIG. 5, and thus for sake of brevity, no further description of these features is provided other than to point out that zone 160 has a greater length at an inner wall 168 than at an inner wall 148, that a zone output edge 167 is generally parallel to manifold back edge 154, that zone 160 could, if desired, be spaced apart from the manifold, and that likewise, land channel 180 could be spaced apart from zone 160.

Referring again to FIGS. 12 and 13, a flow pressure-compensation zone 260 and a land channel 280 are similar to zone 60 and land channel 80, respectively, of FIG. 5, and thus for sake of brevity, no further description of these features is provided other than to point out that a zone output edge 267 is generally parallel to both manifold back edge 254 and manifold output edge 242, that zone 260 could, if desired, be spaced apart from the manifold, and that likewise, land channel 280 could be spaced apart from zone 260.

Advantageously, the embodiments of FIGS. 10–13 provide for a uniform wetted surface area across the width from the manifold back edge to the exit orifice. This feature is provided by the manifold back edge being generally parallel to the exit orifice. As a result, deflection forces are further equalized and non-uniform, die body deflection is further minimized in this embodiment.

Operation of coextrusion apparatus 10, shown in FIGS. 5–9, will now be described. As indicated, an apparatus in accordance with the present invention, is provided with suitable gaps and lengths for the compensating zone and land channel based primarily upon stream rheology, flow rate, desired flow stream process characteristics, pressure drop, shear rate and shear stress.

Within the feedblock, flow streams are combined at the locus of the channel convergence, and the composite stream is passed in a first main flow direction into a near end of manifold 34. The composite stream undergoes a progressive drop in flow pressure as it flows from the locus of convergence to far end 44 of the manifold. As a result, the stream has a greater flow pressure near locus 38 at which directional change begins, than at far end 44.

Within the manifold, the flow direction of the stream changes to a second main flow direction. This flow direction leads to the exit orifice and is generally perpendicular to the first main flow direction. The stream exits the manifold and passes in the second main flow direction, through flow pressure-compensating zone 60, after which the stream beneficially has substantially equal flow volume across its width. Thereafter, the stream passes in the second main flow direction, through land channel 80 and exit orifice 50. It is my theory that transverse flow pressure equalization progressively shifts, from start-up until a steady state operation is reached, from the output edge of zone 60 upstream until it is attained at the manifold output edge.

It will be understood that due to a uniform wetted surface area across the width from the manifold output edge to the exit orifice, non-uniform die body deflection is reduced. As a result, less lip gap adjustment is necessary to compensate for non-uniform thickness due to non-uniform, die body deflection.

Figure 14:
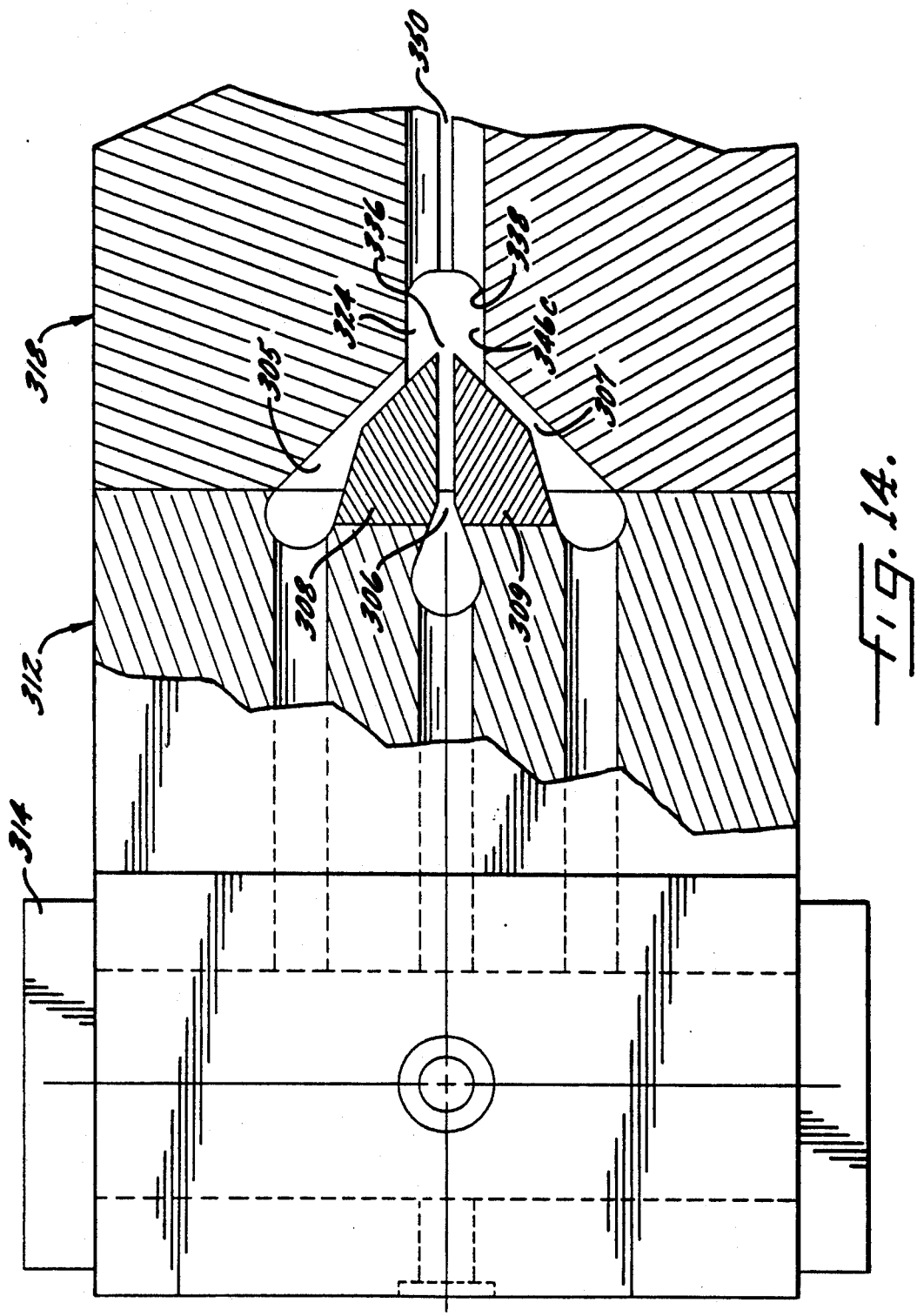
FIG. 14 is a partial, cross-sectional view illustrating a preferred feature of the present invention.

With reference to FIG. 14, in which like parts have been numbered in correspondence to FIG. 5, flow channel convergence may be provided for within extrusion die 318. More particularly, flow channels 305, 306, 307 separated by dividers 308, 309, as shown, may converge at a locus 336. Beneficially, the locus of convergence may be proximate to a downstream locus 338 at which flow directional change begins. By proximate is meant within several inches, that is, within about 2 to 4 inches, up to as close as structurally possible to the locus at which directional change begins.

Having described the invention in detail and by reference to preferred embodiments thereof, it will be apparent that modifications and variations are possible without departing from the scope of the invention defined in the appended claims. Several changes or modifications have been briefly mentioned for purposes of illustration.

I claim:

1. An end feed, extrusion apparatus comprising
   first channel portion means for providing for flow generally in a first main flow direction leading to an end of said first channel portion means and for directional change to a second main flow direction without flow divergence, wherein said first channel portion means has a back edge and an output edge; wherein said back edge or said output edge is rectilinear, and the other edge is angled toward said rectilinear edge; or wherein both said back edge and output edge are rectilinear;
   downstream of said first channel portion means, second channel portion means for incrementally compensating for progressive decrease in flow pressure in said first main flow direction within said first channel portion means, the flow pressure-compensating, channel portion means being a multi-stage zone having a rectilinear output edge and comprising a primary stage having a greater length in said second main flow direction at an end located closer to a locus at which said directional change commences, than to said end of said first channel portion means, and in direct fluid communication with said primary stage, a secondary stage of inversely changing length relative to said primary stage, and being of greater gap and diminished flow pressure-compensating effect compared to said primary stage; and
   downstream of said flow pressure-compensating, channel portion means, an exit orifice.

2. The end feed, extrusion apparatus of claim 1, further comprising flow channels that converge at a locus upstream of and proximate to said locus at which said directional change commences.

3. The end feed, extrusion apparatus of claim 1, wherein downstream of said locus at which said directional change commences, said first channel portion means has a non-circular, cross-sectional shape.

4. The end feed, extrusion apparatus of claim 3, wherein said non-circular, cross-sectional shape is generally rectangular.

5. The end feed, extrusion apparatus of claim 1, wherein said first channel portion means has a decreasing cross-sectional area from said locus at which said directional change commences, to said end of said first channel portion means.

6. The end feed, extrusion apparatus of claim 1, wherein from said locus at which said directional change commences, to said end of said first channel portion means, said first channel portion means has a constant aspect ratio, cross-section.

7. The end feed, extrusion apparatus of claim 1, wherein said first channel portion means is provided with a cross-sectional geometry that provides for a substantially constant shear rate from a locus upstream of said locus at which said directional change commences, to said end of said first channel portion means.

8. The end feed, extrusion apparatus of claim 1, wherein said first channel portion means has a rectilinear output edge, and said back edge is angled toward said rectilinear output edge.

9. The end feed, extrusion apparatus of claim 1, wherein said secondary stage is of substantially constant gap transverse to said second main flow direction.

10. The end feed, extrusion apparatus of claim 9, wherein said primary stage is of substantially constant gap transverse to said second main flow direction.

11. The end feed, extrusion apparatus of claim 1, wherein a transition wall bridging between said secondary stage and said primary stage, is non-linear transverse to said second main flow direction.

12. The end feed, extrusion apparatus of claim 1, further comprising downstream of said flow pressure-compensating, channel portion mans, channel portion means of less gap than said primary stage and that terminates in said exit orifice.

13. The end feed, extrusion apparatus of claim 1, wherein said first channel portion means has a rectilinear back edge, and said output edge is angled toward said rectilinear back edge.

14. An end feed, extrusion process comprising end feeding a stream generally in a first main flow direction to an end of a first channel portion whereby said stream has a progressively decreasing flow pressure in said first main flow direction, said first channel portion providing for directional change to a second main flow direction without flow divergence, and being provided with a back edge and an output edge; wherein said back edge or said output edge is rectilinear, and the other edge is angled toward said rectilinear edge; or wherein both said back edge and output edge are rectilinear;

passing said stream without flow divergence, through said first channel portion, whereby said stream is flowing in said second main flow direction;

thereafter, passing said stream in said second main flow direction, through a flow pressure-compensating, channel portion having a rectilinear output edge and comprising a primary stage having a greater length at an end located closer to a locus at which said directional change commences, than to said end of said first channel portion, and in direct fluid communication with said primary stage, a secondary stage of inversely changing length relative to said primary stage, wherein said stream is subjected to an increasing shear rate in said second main flow direction, as it passes from said secondary stage to said primary stage; and thereafter, passing said stream in said second main flow direction, through an exit orifice;

whereby said stream is provided with improved uniformity in flow volume across its width prior to reaching said exit orifice, and exerts reduced non-uniform, deflection forces across its width.

15. The process of claim 14, wherein said stream is a composite layered stream with the layers in contiguous relationship, and flow stream convergence occurs upstream of and proximate to said locus at which said directional change commences.

16. The process of claim 14, wherein said stream has a non-circular cross-section within said first channel portion.

17. The process of claim 16, wherein said stream has a generally rectangular cross-section within said first channel portion.

18. The process of claim 14, wherein said stream flows at a substantially constant shear rate as it flows in said first main flow direction, from said locus at which said directional change commences, to said end of said first channel portion.

19. The process of claim 14, wherein said stream is under constant shear transverse to said second main flow direction, as it passes through said second stage.

20. The process of claim 19, wherein said stream is under constant shear transverse to said second main flow direction, as it passes through said primary stage.

21. The process of claim 14, wherein said stream is subjected as it passes through said flow pressure-compensating, channel portion, to a non-linear decrease in resistance to flow transverse said second main flow direction.

22. The process of claim 14, wherein said stream is subjected to an increasing shear rate in said second main flow direction, as it passes from said primary stage to a land channel portion that terminates in said exit orifice.

23. The process of claim 14, wherein said first channel portion has a rectilinear back edge, and said output edge is angled toward said rectilinear back edge.

24. The process of claim 14, wherein said first channel portion means has a rectilinear output edge, and said back edge is angled toward said rectilinear output edge.

* * * * *